(12) United States Patent
Henin

(10) Patent No.: US 9,130,488 B2
(45) Date of Patent: Sep. 8, 2015

(54) GENERATING SET PRELOADER

(75) Inventor: Eric Henin, Surrey (GB)

(73) Assignee: MTU Friedrichshafen GmbH, Friedrichshafen (DE)

( * ) Notice: Subject to any disclaimer, the term of this patent is extended or adjusted under 35 U.S.C. 154(b) by 156 days.

(21) Appl. No.: 13/499,053

(22) PCT Filed: Oct. 12, 2010

(86) PCT No.: PCT/GB2010/001901
§ 371 (c)(1),
(2), (4) Date: Mar. 29, 2012

(87) PCT Pub. No.: WO2011/045564
PCT Pub. Date: Apr. 21, 2011

(65) Prior Publication Data
US 2012/0200153 A1    Aug. 9, 2012

(30) Foreign Application Priority Data

Oct. 13, 2009 (GB) .................................. 0917952.4

(51) Int. Cl.
*F02D 29/06* (2006.01)
*H02P 9/10* (2006.01)
(52) U.S. Cl.
CPC ..................................... *H02P 9/102* (2013.01)
(58) Field of Classification Search
USPC ....................... 290/40 B, 40 R; 322/8; 363/17
See application file for complete search history.

(56) References Cited

U.S. PATENT DOCUMENTS

| 4,300,089 | A | * | 11/1981 | Kawabe et al. ................... 322/8 |
| 4,862,058 | A | | 8/1989 | Engleman et al. |
| 5,390,068 | A | | 2/1995 | Schultz et al. |
| 5,737,197 | A | * | 4/1998 | Krichtafovitch et al. ....... 363/17 |
| 6,130,486 | A | | 10/2000 | Shimizu et al. |
| 6,239,511 | B1 | | 5/2001 | Joho |
| 2002/0047271 | A1 | | 4/2002 | Shimizu et al. |
| 2002/0089311 | A1 | | 7/2002 | Shimizu et al. |
| 2005/0116474 | A1 | | 6/2005 | Edelson |
| 2006/0278191 | A1 | | 12/2006 | Dolker |
| 2007/0182158 | A1 | | 8/2007 | Cerney et al. |
| 2007/0278801 | A1 | | 12/2007 | Kamimura et al. |
| 2008/0018112 | A1 | | 1/2008 | Kleen |

FOREIGN PATENT DOCUMENTS

GB          1546413          5/1979

* cited by examiner

*Primary Examiner* — Tho D Ta
(74) *Attorney, Agent, or Firm* — Stites & Harbison, PLLC; David W. Nagle, Jr.

(57) ABSTRACT

An diesel or gas engine-generator unit comprises an internal combustion engine and an alternator, the output of which unit, in use, is adapted to supply electrical power to a site load. The unit is further provided with means to apply a further load (2) to the unit controllable by a switching arrangement (4,5), the unit further comprising a controller, which can be the genset controller, which is adapted to control the switching unit to apply the further load (2) before electrical power is supplied to the site load. This preloading of the generator enables significantly greater load steps to be applied to the genset. The preload can be a resistive, capacitive or inductive load and can also be applied in steps.

5 Claims, 4 Drawing Sheets

GENERATING SET PRELOADER

CROSS-REFERENCE TO RELATED APPLICATIONS

The present application is a national stage filing of PCT International Application No. PCT/GB10/01901 filed on Oct. 12, 2010, and further claims priority to GB Application No. 0917952.4 filed on Oct. 13, 2009.

FIELD OF THE INVENTION

The invention relates to an internal combustion engine-generator unit or genset comprising an internal combustion engine and an alternator, the output of which unit, in use, is adapted to supply electrical power to a site load, the supply of electrical power being controllable by a switching arrangement.

BACKGROUND OF THE INVENTION

The majority of generators, which are also known as generating sets or gensets, are operated at some point without synchronisation to the mains electricity supply and in many cases are used as an emergency back up supply to the mains electricity supply. Thus, when a load is connected to the generator, it should be able to accept a current inrush within certain parameters and these are regulated by industrial standards such as ISO 8528. The current inrush corresponds to a power surge commonly referred to as a load step, and the maximum load step that can safely be applied to an engine is generally regarded as being about half of the fuel stop power of the engine, i.e., the maximum power that the engine is capable of delivering transiently. In practice, therefore, when preparing a specification for a generator, the end user will require a generator with a power rating about twice the magnitude of the anticipated load step.

However, during continuous running of the generator, the running load on the generator will often be significantly lower than the load step and can be as little as 15-30% of the magnitude of the load step.

The load step requirements of the generator result in all the equipment and material associated with the generator, such as the engine room, silencers and canopies, in addition to the generator itself, being significantly oversized with respect to the requirements of the running load on the generator. An additional consequence of this is that the efficiency and performance of the generator is affected with common drawbacks being higher fuel consumption and $CO_2$ emissions and excessive wear due to the low loads. This, in turn, leads to higher maintenance costs in addition to the higher capital costs of the oversize generator.

Different approaches to reducing this problem, such as load shedding, have been tried but the additional costs of these approaches are similar to the additional costs of an oversized generator. Therefore, these approaches have not been widely adopted. In practice, most commercial gensets cannot reach more than a load step of about 67% of the fuel stop power without a substantial risk of stalling. Such gensets would also fall outside the acceptance standards of the industry standard ISO 8528.

U.S. Pat. No. 4,862,058 discloses a DC power source having an artificial load that continuously regulates the voltage going to the actual load and focuses on maintaining a steady state on the load by creating a permanent voltage differential between the source and the load or tool in use. The approach suffers from a number of limitations that restrict its use to DC applications and it does not address any of the problems of the load step discussed above.

U.S. Pat. No. 6,239,511 discloses the use of an external load in conjunction with a turbine driven generator, which is connected to the mains electricity supply. Turbine driven generators are notoriously difficult to start and get up to synchronisation. As such, there is no load step requirement as the application of the load will be done by synchronising the generator to the mains. Load is then progressively and slowly applied to the generator. This approach is not relevant to the present invention, which deals with the problem where the load is applied without mains support, which generates a load step. The problem of the invention arises when there is a loss of mains power.

SUMMARY OF THE INVENTION

The present invention seeks to provide a genset with an improved load step response.

According to the invention, there is provided an internal combustion engine-generator unit comprising an internal combustion engine and an alternator, the output of which unit, in use, is adapted to supply electrical power to a site load, the supply of electrical power being controllable by a switching arrangement, wherein the unit is further provided with means to apply a further load to the unit controllable by a switching arrangement, the unit further comprising a controller adapted to control the switching arrangement to apply the further load before electrical power is supplied to the site load.

In a preferred embodiment, the further load can be applied to the unit in stages and/or progressively. Preferably, the further load comprises a plurality of loads, and the switching arrangement comprises a switching arrangement for each of the plurality of loads, wherein the individual application of which loads is controllable by the controller so that, in use, the applied load can be increased or decreased in stages.

Preferably, in use, the switching arrangement breaks the connection to further load before closing the connection to the site load. Preferably, the further load comprises a resistive load, a capacitive load or an inductive load. Preferably, the further load is in the range of 60-65% of a load step. The load step will usually be the application of the site load.

The principle underlying the invention is to apply an artificial load to the generator output before the actual site load is applied. The preload is then removed at or around the time that the site load is applied. The genset then takes the site load from far better conditions, thereby resulting in fewer distortions to the genset output than if the site load is applied without the preload.

In contrast to the prior art solutions, the invention looks at frequency as well as voltage and does not replicate the role of the voltage regulator, that will typically be integrated into the genset. The voltage to the load is not affected but the load fluctuations are smoothed, thereby resulting to the advantages outlined above.

BRIEF DESCRIPTION OF THE DRAWINGS

Exemplary embodiments of the invention will now be described in greater detail with reference to the drawings in which.

DETAILED DESCRIPTION OF THE INVENTION

Figure 1A:
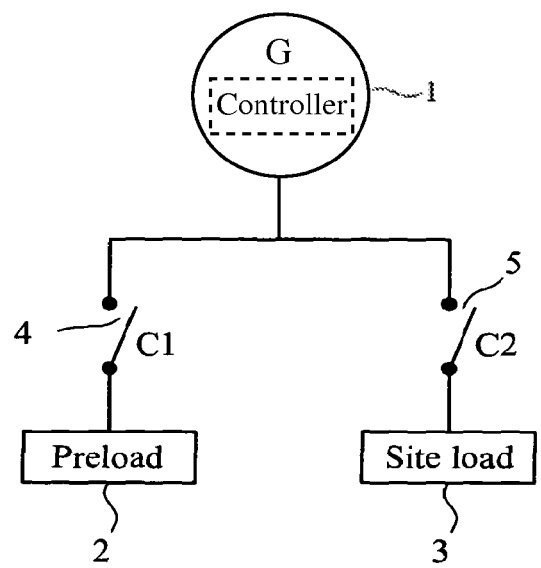
FIGS. 1a-c show schematically a first embodiment of the preloader.
Figure 1B:
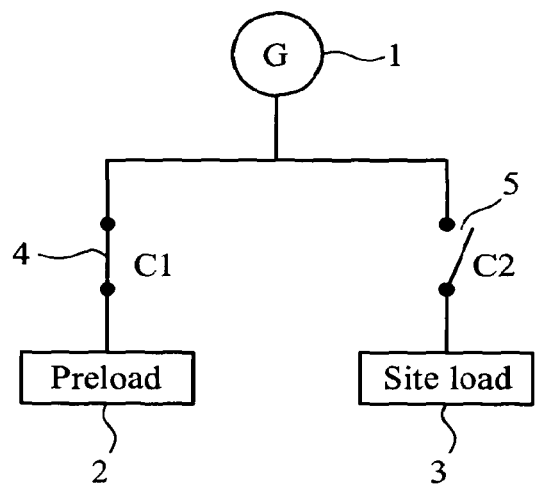
Figure 1C:
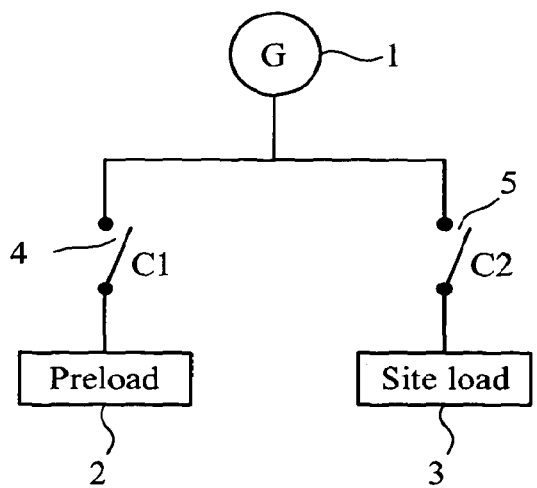

FIGS. 1*a-c* show schematically a generator set 1 which is electrically connectable with a preload 2 and a site load 3. Switches 4 and 5 are provided between the generator and the preload 2 and site load 3, respectively. The generator set 1 will typically comprise a diesel engine and alternator, together with control devices, such as an engine management controller, to control fuel injection and monitor load and exhaust emissions to ensure compliance with emissions regulations and fuel efficient operation of the diesel engine. Typically, a further controller can be provided to control the engine fan and vent and to provide speed boost control.

In FIG. 1*a*, both the switches 4 and 5 are open and the generator set (or genset) 1 is started and operating at low output levels. Once the genset 1 is operating at an output appropriate for the preload, the switch 4 is closed as shown with reference to FIG. 1*b* thereby connecting the preload 2 with the genset 1. The principle of the preload is to apply an artificial load to the genset 1 before an actual site load is applied. The pre-load in this case is a resistive load comprising a set of one or more resistors. In most cases, the characteristics of the site load 3 will be known or can be anticipated, so that the set of resistors in the pre-load can be adapted to the characteristics of the site load 3. Once the genset 1 and preload are connected, the genset frequency and voltage will fluctuate before returning to the site load application conditions.

When the genset 1 has reached conditions suitable to apply the site load 3, the switch 4 is opened and the switch 5 is closed thereby disconnecting the preload 2 and connecting the genset 1 to the site load 3. The genset frequency and voltage fluctuate before returning to steady-state conditions. The switching of the switches 4 and 5 will typically be controlled automatically by an independent controller when it is detected that a site load is required but it would be possible to include the functionality on the genset or engine management controller. For purpose of example, in FIG. 1*a*, the controller is shown as part of the genset 1. In principle, the genset controller would be most advantageous as this controller monitors the voltage and this signal can be used as a control signal. Individual signal monitoring would usually involve additional costs.

Known gensets cannot achieve more than a 67% load step and even below this level, there is a substantial risk of stalling. However, if a preload of 50% of the desired load step is applied in accordance with the embodiment of FIGS. 1*a-c*, the same genset will be able to achieve a load step of 100% quite comfortably and still remain within the ISO 8528 G3 standard. For example, a single-stage 60% preload offers a 110% site load step for diesel-based gensets with good general performances, based on ISO 8528-G2.

Figure 2A:
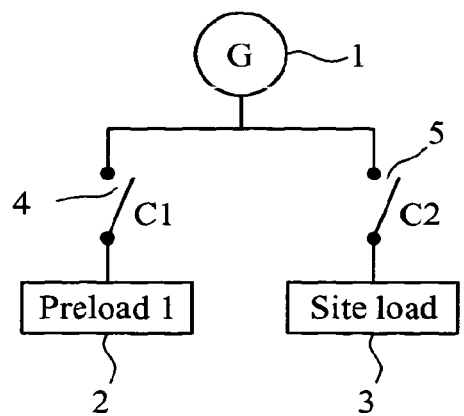
FIGS. 2a-d show schematically a second embodiment of the preloader.
Figure 2B:
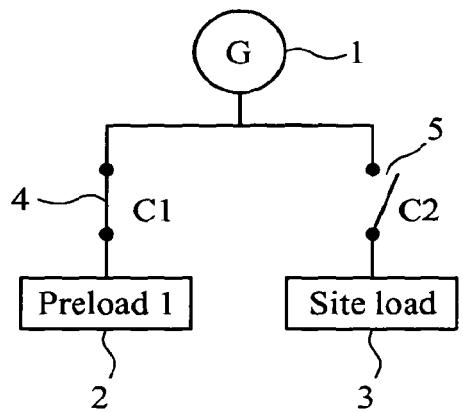
Figure 2C:
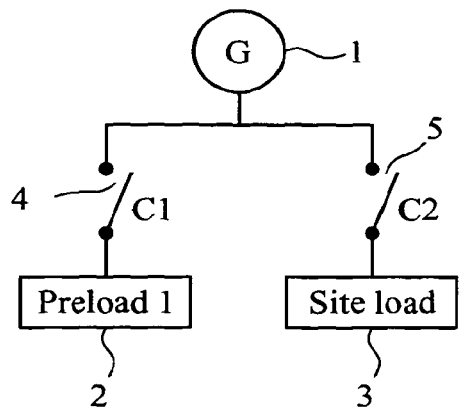
Figure 2D:
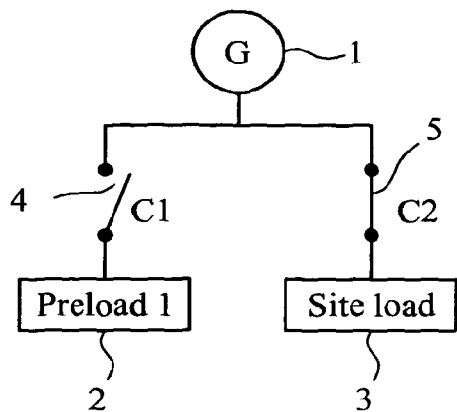

The embodiment described in connection with FIGS. 1*a-c* is suitable for many straightforward applications. However, in some cases, subtle timing variations may be an alternative. FIGS. 2*a-d* shows an alternative embodiment adapted to these circumstances. FIGS. 2-2*a* and 2*b* correspond to FIGS. 1*a* and 1*b* in that both the switches 4 and 5 are open and the genset 1 is started and operating at low output levels; once the genset 1 is operating at an output appropriate for the preload, the switch 4 is closed as shown with reference to FIG. 2*b* thereby connecting the preload 2 with the genset 1.

However, once the genset 1 reaches conditions suitable to apply the preload 2, the switch 4 is opened whilst switch 5 also remains open. In this state, the genset frequency and voltage increase. The switch 5 can then be closed after a short delay connecting the genset 1 to the site load 5 and the genset frequency and voltage will again fluctuate before returning to steady-state conditions. One advantage of this approach is that it is easier to keep the transient voltage and frequency within specified requirements such as if only part of the site load is to be applied, or, conversely removed and the remainder of the site load is to be applied in one or more subsequent steps.

Alternatively, instead of having a time lag between the operations of the switches, it would also be possible to have a very short time lead, where both switches were closed at the same time. In this case, the voltage and frequency of the genset output would decrease rather than increase, which may be desirable for certain applications. This can happen where the site load is unknown or changes after the genset is built.

Figure 3A:
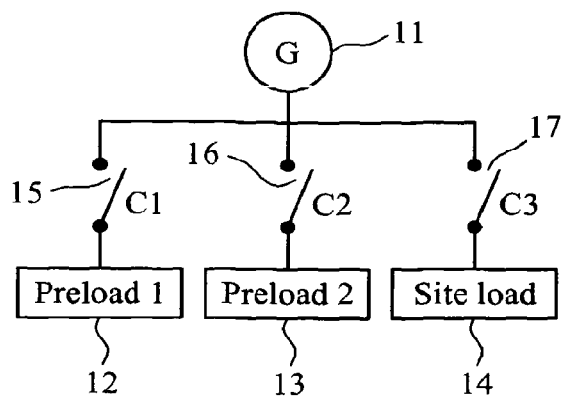
FIGS. 3*a-d* show schematically a third embodiment of the preloader.
Figure 3B:
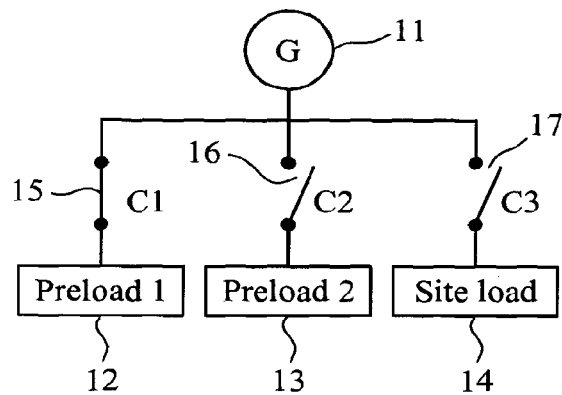
Figure 3C:
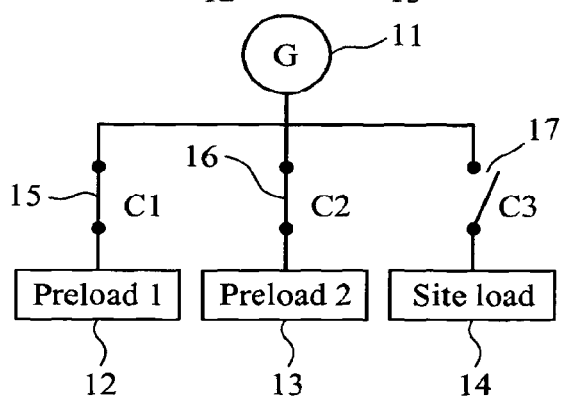
Figure 3D:
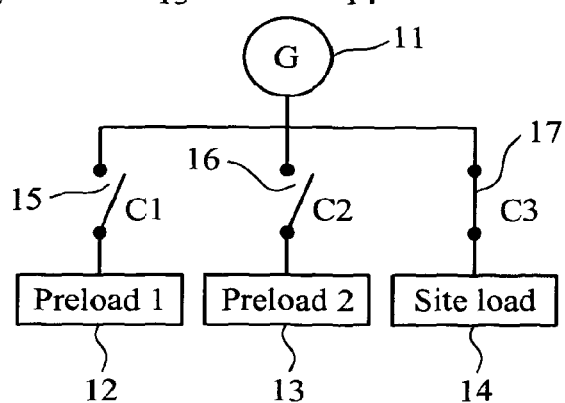

FIGS. 3*a*-3*d* schematically show a further alternative embodiment in which the preload can be enabled in steps. FIG. 3*a* shows schematically a generator set 11 which is electrically connectable with a first preload 12, a second preload 13 and a site load 14. Switches 15, 16 and 17 are provided between the generator and the preload 12, preload 13 and site load 14, respectively.

In the initial condition the three switches 15, 16, and 17 are in the open position. The genset 11 is started and is run up to preloading conditions. Once the genset 11 has reached an operating condition suitable for the application of the first preload 12, the switch 15 can be closed connecting the genset 11 to the first preload 12. This causes the genset frequency and voltage to fluctuate before returning to preload conditions.

In a subsequent condition, the genset 11 reaches an operating condition suitable for the application of the second preload 13. The switch 16 is then closed connecting to genset 11 additionally to the second preload 13. This results in the frequency and voltage of the genset 11 fluctuating before returning to the site load application conditions.

Finally, when the genset 11 reaches the operating conditions suitable to apply the site load, the switches 15 and 16 are opened and the switch 17 is closed, thereby connecting the genset 11 to the site load 14. The genset frequency and voltage fluctuate before returning to steady-state conditions. In this case, dual-stage 50%+25% preload would offer 110% site load step for diesel-based gensets with poorer performance to ISO 8528-G2 or for diesel-based gensets with good general performances, to the more demanding ISO 8528-G3.

The embodiment described with reference to FIGS. 3*a*-3*d* makes each load step easier for the genset 11 to accept, which can reduce the time the genset 11 requires to reach suitable operating conditions to accept the transfer of the site load. One particular application of this is for turbocharged engines, which generally cannot accept load steps greater than 60% to 80% for diesel engines and as low as 10% to 15% for gas engines. The use of a staged preloading permits a load step in excess of 100% to be achieved with a minimal distortion of the characteristics of the genset. For example, for gas engine based gensets, multiple stages of 10% of preloads could be used, with step-down by 30% (3 sets of 10%) stages.

As an alternative to the use of two fixed preloads, which can be of different magnitudes, it would be possible to use one or more variable resistive loads that are applied progressively until the preload magnitude reaches the desired magnitude. The use of a variable preload smoothes the loading ramps applied to the genset, which permits a wider range of engines to be used in the genset for any particular application. It should be noted that the load ramps in this embodiment are only used in a transient manner: to reach either the load application or the engine stop position. These ramps are not part of a regulation process.

Figure 4A:
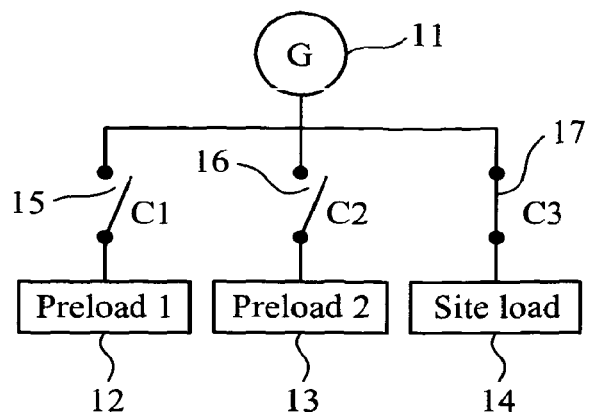
FIGS. 4*a-d* show the preloader of FIG. 3*a-d* with the site load being disconnected.
Figure 4B:
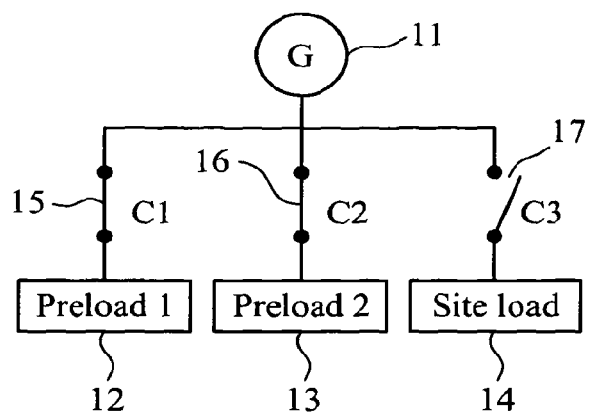
Figure 4C:
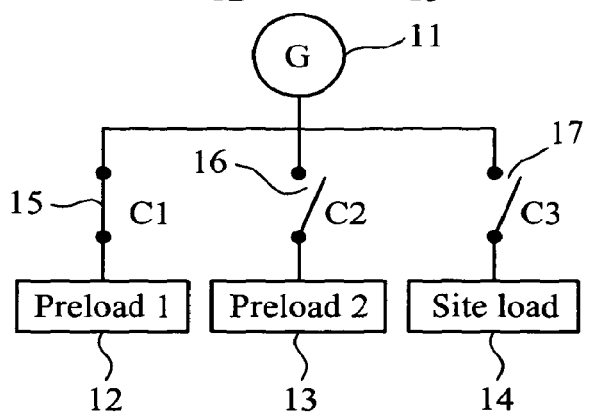
Figure 4D:
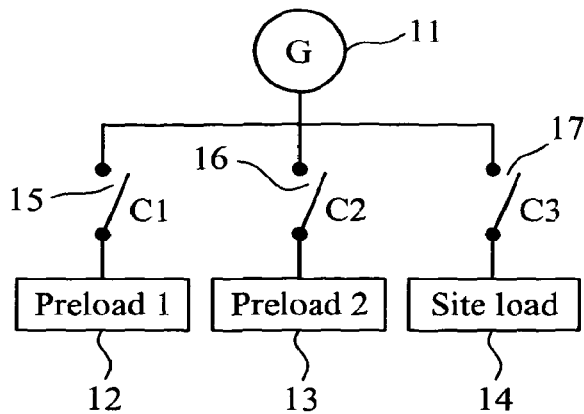

The preload can also be used to limit any overshoot of the genset such as when a site load is removed or when an inrush reverts to running conditions. FIG. 4a corresponds to the load situation described in relation to FIG. 3d in that the switches 15 and 16 are open and the site load 14 is connected to the genset 11. One known problem with gensets is that the sudden withdrawal of a load can send the engine into overspeed. As the engine will usually be provided with an overspeed control, the overspeed control would automatically cut out the engine which would prevent any cool down period or standby running mode.

When the site load is to be disconnected from the genset 11, the switches 15 and 16 are closed and the switch 17 is opened, thereby connecting the genset 11 to both preloads 12 and 13 but disconnecting the site load 14. The genset frequency and voltage will fluctuate before returning to more stable conditions. The switch 16 can then be opened to leave the genset 11 connected only to the first preload 12, at which point the genset frequency and voltage will fluctuate before stabilising. Finally, the switch 15 is then opened disconnecting the genset 11 from the remaining preload. The genset 11 can then be allowed to run or stopped once operating conditions have stabilised. The use of the preload in these circumstances reduces the likelihood of the engine entering overspeed significantly by using the staged withdrawal of the preload.

It is also possible for the genset to run with droop before the application of the preload. This will typically allow a preload of 65% instead of 60% in the example above and hence a better 110% response for the load step. The droop could be removed at or after application of the preload and the droop control can be integrated with the preload controller to provide a droop switch.

Although the switching in of the pre-load can be carried out automatically, in particular where the genset load is being monitored, on older systems where the load is not monitored, the pre-load could be switched in manually. Alternatively, if a known load step is to be applied, the preload could also be switched in manually then.

Although the preload has been described as a resistive load, it would also be possible to use reactive preloads such as inductive or capacitive loads. The switches can also be implemented using contactors, motorised breakers or progressive ramps.

For older engines, where the load data is not actually measured or recorded, it may be preferable to use a timer function to control the switching rather than the genset or engine management controls. This would also have the advantage that the solution would be easier to retrofit to existing gensets. In some applications, it may also be advantageous to control the switching based on the alternator output.

The invention claimed is:

1. An internal combustion engine-generator unit comprising an internal combustion engine and an alternator, wherein the output of the internal combustion engine-generator unit, in use, is adapted to supply electrical power to a site load, the supply of electrical power being controllable by a switching arrangement, such that application of electrical power to the site load generates a current inrush that corresponds to a power surge commonly referred to as a load step, characterised in that the internal combustion engine-generator unit is further provided with means to apply a preload to the internal combustion engine-generator unit controllable by the switching arrangement, wherein the preload is a resistive load comprising a set of one or more resistors, the resistive load being adapted to the characteristics of the site load, and the internal combustion engine-generator unit further comprising a controller adapted to control the switching arrangement to apply the preload before electrical power is supplied to the site load, whereby application of the preload is adapted to reduce distortions in the output of the internal combustion engine-generator unit due to the load step, characterised in that, in use, the switching arrangement breaks the connection to the preload before closing the connection to the site load.

2. The internal combustion engine-generator unit according to claim 1, characterised in that the preload comprises a plurality of loads, and the switching arrangement comprises a switching arrangement for each of the plurality of loads, wherein the individual application of which loads is controllable by the controller so that, in use, the preload can be increased or decreased in stages.

3. The internal combustion engine-generator unit according to claim 1, characterised in that the preload can be applied to the internal combustion engine-generator unit in stages and/or progressively.

4. The internal combustion engine-generator unit according to claim 3, characterised in that the preload comprises a plurality of loads, and the switching arrangement comprises a switching arrangement for each of the plurality of loads, wherein the individual application of which loads is controllable by the controller so that, in use, the applied preload can be increased or decreased in stages.

5. An internal combustion engine-generator unit comprising an internal combustion engine and an alternator, wherein the output of the internal combustion engine-generator unit, in use, is adapted to supply electrical power to a site load, the supply of electrical power being controllable by a switching arrangement, such that application of electrical power to the site load generates a current inrush that corresponds to a power surge commonly referred to as a load step, characterised in that the internal combustion engine-generator unit is further provided with means to apply a preload to the internal combustion engine-generator unit controllable by a first switch of the switching arrangement, wherein the preload is a resistive load comprising a set of one or more resistors, the resistive load being adapted to the characteristics of the site load, and the internal combustion engine-generator unit further comprising a controller adapted to control the first switch of the switching arrangement to apply the preload before electrical power is supplied to the site load by a second switch of the switching arrangement, whereby application of the preload is adapted to reduce distortions in the output of the internal combustion engine-generator unit due to the load step, characterised in that, in use, the switching arrangement causes the first switch and the second switch to be closed at the same time for a predetermined time period, before the first switch is opened to break the connection to the preload, while the second switch remains closed.

* * * * *